US007891093B2

(12) United States Patent
Hibi

(10) Patent No.: US 7,891,093 B2
(45) Date of Patent: Feb. 22, 2011

(54) METHOD FOR MANUFACTURING AN INKJET HEAD

(75) Inventor: Manabu Hibi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 211 days.

(21) Appl. No.: 12/320,646

(22) Filed: Jan. 30, 2009

(65) Prior Publication Data

US 2009/0151858 A1 Jun. 18, 2009

Related U.S. Application Data

(62) Division of application No. 11/044,467, filed on Jan. 28, 2005, now Pat. No. 7,503,642.

(30) Foreign Application Priority Data

Jan. 30, 2004 (JP) ............................ 2004-023805

(51) Int. Cl.
*B23P 17/00* (2006.01)
*B41J 2/045* (2006.01)
*G01D 15/00* (2006.01)

(52) U.S. Cl. .......................... 29/890.1; 29/831; 29/832; 29/837; 29/852; 347/68; 216/27

(58) Field of Classification Search ................ 29/890.1, 29/832, 837, 852, 857, 830, 831; 216/27, 216/71; 347/68–70.71, 72, 50; 156/145
See application file for complete search history.

(56) References Cited

U.S. PATENT DOCUMENTS 5,402,159 A * 3/1995 Takahashi et al. .............. 347/9
5,639,508 A * 6/1997 Okawa et al. ............... 427/100
5,872,583 A * 2/1999 Yamamoto et al. ............ 347/70
5,929,881 A * 7/1999 Kitahara et al. ............... 347/70
6,431,691 B1 8/2002 Tanikawa et al.
6,979,074 B2 12/2005 Watanabe et al.
7,036,916 B2 5/2006 Sakaida et al.
2003/0156157 A1 8/2003 Suzuki et al.
2004/0041885 A1 3/2004 Hirota

FOREIGN PATENT DOCUMENTS

JP A-4-341852 11/1992
JP A-2003-165215 6/2003

OTHER PUBLICATIONS

Japanese Office Action with English-Language Translation issued in Japanese Patent Application No. 2004-023805 on Nov. 17, 2009.

* cited by examiner

*Primary Examiner*—Derris H Banks
*Assistant Examiner*—Tai Nguyen
(74) *Attorney, Agent, or Firm*—Oliff & Berridge, PLC

(57) ABSTRACT

An inkjet head includes a channel unit and actuator units. Inside the channel unit, individual ink channels are formed so that ink supplied from ink inlets is ejected from nozzles via pressure chambers. The actuator units are bonded to the upper surface of the channel unit. The actuator units have a configuration of four piezoelectric sheets laminated to one another. On the upper surface of the piezoelectric sheet, individual electrodes are disposed in positions opposed to the pressure chambers respectively. A FPC for supplying driving signals to the actuator units is connected to the individual electrodes.

13 Claims, 10 Drawing Sheets

METHOD FOR MANUFACTURING AN INKJET HEAD

This application is a division of U.S. patent application Ser. No. 11/044,467, filed Jan. 8, 2005, the entire contents of which are hereby incorporated by reference.

BACKGROUND OF THE INVENTION

1. Field of the Invention

The present invention relates to an inkjet head which ejects ink to a recording medium to perform printing thereon, and a method for manufacturing the inkjet head.

2. Description of the Related Art

In an inkjet head which is used in an inkjet printer or the like, ink supplied from an ink tank is distributed to a plurality of pressure chambers. A pulsed pressure wave is selectively applied to the pressure chambers to eject ink from nozzles. As a means of selectively applying pressure to the pressure chambers, an actuator unit may be used. In the actuator unit, a plurality of piezoelectric sheets made from piezoelectric ceramic are laminated.

As an example of such an inkjet head, there is known an inkjet head having an actuator unit in which a plurality of continuous flat-plate-like piezoelectric sheets extending over a plurality of pressure chambers are laminated, and at least one of the piezoelectric sheets is put between a common electrode shared by a large number of pressure chambers and kept in ground potential and a large number of individual electrodes, that is, drive electrodes located in positions opposed to the pressure chambers respectively (see JP-A-4-341852 (FIG. 1)). Each part of the piezoelectric sheet put between the individual electrodes and the common electrode and polarized in the laminated direction expands and contracts in the laminated direction by so-called piezoelectric longitudinal effect due to an external electric field applied to the piezoelectric sheet in the polarizing direction thereof when the individual electrodes on the both sides of the part put between the individual electrodes and the common electrode are brought into potential different from that of the common electrode. In this event, the piezoelectric sheet part put between each individual electrode and the common electrode serves as an active layer which can be deformed due to piezoelectric effect when an external electric field is applied thereto. As a result, the volume of a pressure chamber corresponding to the part is changed so that ink can be ejected toward a recording medium from a nozzle communicating with the pressure chamber.

SUMMARY OF THE INVENTION

In recent years, in the inkjet head as described above, so-called structural crosstalk has cropped up as pressure chambers are disposed in high density in order to meet demands for enhancement in image resolution or in print speed. That is, when an active layer opposed to one pressure chamber is deformed, elements of the piezoelectric sheet opposed to adjacent pressure chambers are also deformed so that ink is ejected from ink outlets which should not eject ink originally, or the amount of ejected ink is made larger or smaller than its original amount. Particularly, a land formed to extend from each individual electrode to a position where the land is not opposed to any pressure chamber serves as an input portion of a voltage to be applied to the individual electrode, but does not drive the pressure chamber directly. Therefore, the land has not been regarded as a factor in occurrence of crosstalk in the background art. However, the inventor of the present invention found that the land can deform the piezoelectric sheet near the land to cause crosstalk. Further, the inventor also ascertained that the influence of the land is measurably large because the land is disposed more closely to an adjacent pressure chamber than the individual electrode. When such structural crosstalk occurs, the quality of a printed image deteriorates. Therefore, in order to improve the image quality of an inkjet printer, lowering of structural crosstalk is an extremely important problem.

It is an object of the invention to provide an inkjet head which can reduce structural crosstalk.

It is another object of the invention to provide a method for manufacturing THE inkjet head in which an actuator unit is hardly damaged.

According to one aspect of the invention, there is provided with a ink jet head which includes: a channel unit including a plurality of pressure chambers communicating with nozzles respectively and arrayed in a plane, and ink channels extending from ink inlets to the nozzles through the pressure chambers respectively; an actuator unit including individual electrodes formed in planar regions of the pressure chambers respectively, a common electrode formed over the individual electrodes, and a piezoelectric sheet put between the common electrode and the individual electrodes, the actuator unit being fixed to one surface of the channel unit parallel to the plane and for changing volumes of the pressure chambers in accordance with deformation of the piezoelectric sheet, each of the individual electrodes including a primary electrode region and a secondary electrode region connected to the primary electrode region and having a planar area smaller than that of the primary electrode region; and a flexible cable including terminals to be connected to the secondary electrode regions respectively and for supplying driving signals to the actuator unit.

With this configuration, each secondary electrode region to which a terminal of the flexible cable will be bonded is present within a planar area of its corresponding pressure chamber. Thus, the distance between the secondary electrode region and each adjacent pressure chamber becomes comparatively long. It is therefore possible to reduce structural crosstalk in which deformation of the piezoelectric sheet has a bad influence on the ink ejection properties of surrounding pressure chambers. Thus, the volumes or velocities of ink droplets to be ejected can be equalized. In addition, the planar area of each secondary electrode region is smaller than that of each primary electrode region. Thus, deformation of the piezoelectric sheet opposed to the primary electrode region becomes difficult to block. In this case, however, when wiring for supplying a driving signal to the land is pressure-bonded to the land by pressure welding or the like, the piezoelectric sheet opposed to the land is bent to the pressure chamber side so that the actuator unit including the piezoelectric sheet may be damaged.

According to another aspect of the invention, there is provided with a method for manufacturing an inkjet head includes: producing a channel unit including a plurality of pressure chambers communicating with nozzles respectively and arrayed in a plane, and ink channels extending from ink inlets to the nozzles through the pressure chambers respectively, the pressure chambers having openings in one surface of the channel unit parallel to the plane; producing an actuator unit including individual electrodes having planar shapes which can be received within planar regions of the pressure chambers respectively, a common electrode formed over a plurality of the individual electrodes, and a piezoelectric sheet put between the common electrode and a plurality of the individual electrodes; bonding the actuator unit to the one surface of the channel unit while aligning the individual electrodes so as to receive the individual electrodes within the planar regions of the pressure chambers respectively; increasing internal pressure in each of the pressure chambers; and pressing a flexible cable against the actuator unit with increased internal pressure in each of the pressure chambers so as to connect terminals of the flexible cable to the individual electrodes of the actuator unit respectively, the flexible cable serving to supply driving signals to the actuator unit. Accordingly, when the individual electrodes are pressed and bonded onto the terminals of the flexible cable respectively, internal pressure in each pressure chamber increases. Thus, the actuator unit becomes difficult to bend on the pressure chamber side, and hence difficult to damage.

BRIEF DESCRIPTION OF THE DRAWINGS

FIG. 6A being an enlarged view of the portion surrounded by the one-dot chain line in FIG. 5; FIG. 6B being a plan view of an individual electrode; and FIG. 6C being a plan view of an individual electrode according to another embodiment of the invention;

DESCRIPTION OF THE PREFERRED EMBODIMENTS

A preferred embodiment of the invention will be described below with reference to the drawings.

Figure 1:
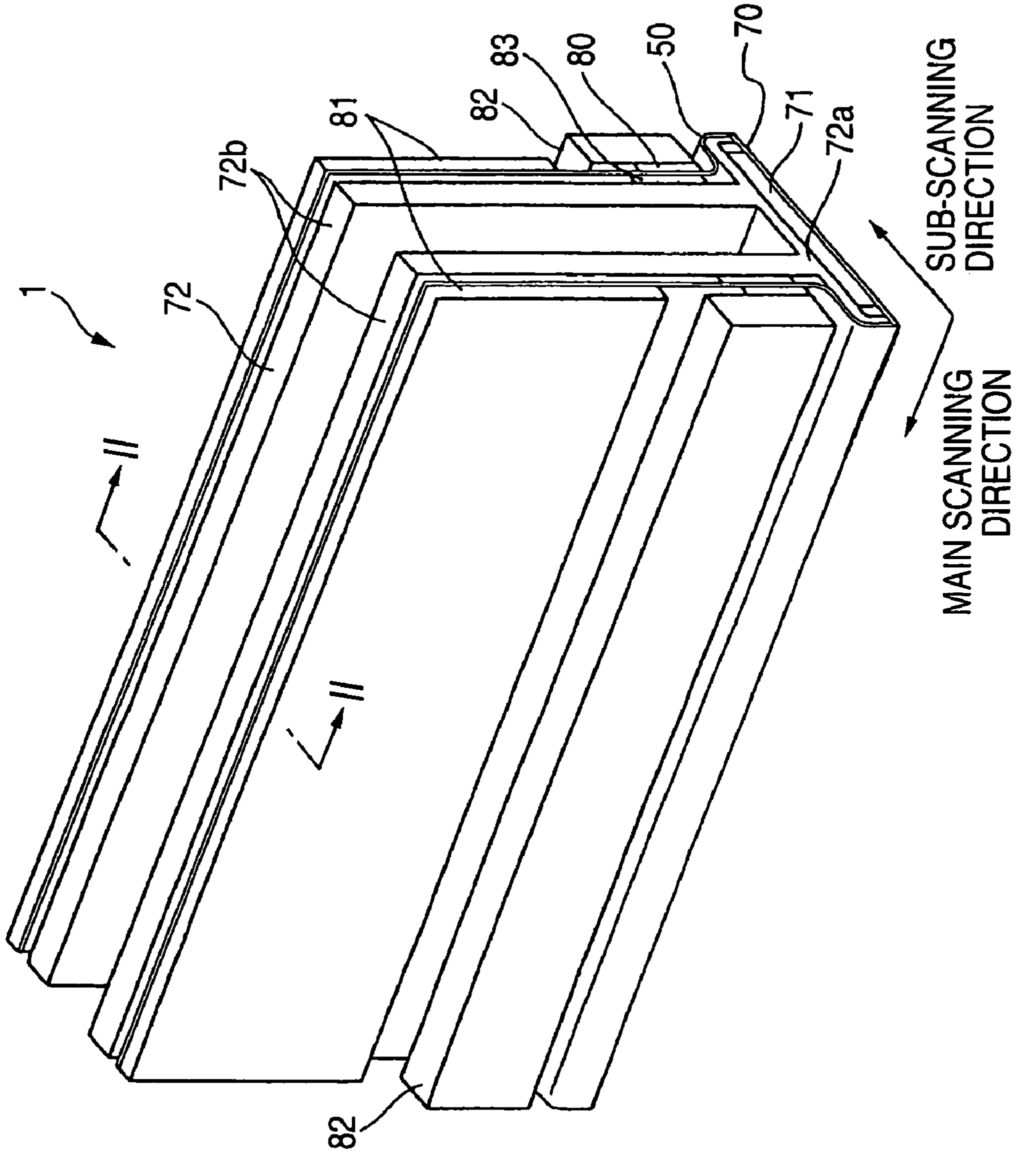
FIG. 1 is an outside perspective view of an inkjet head according to an embodiment of the invention.
Figure 2:
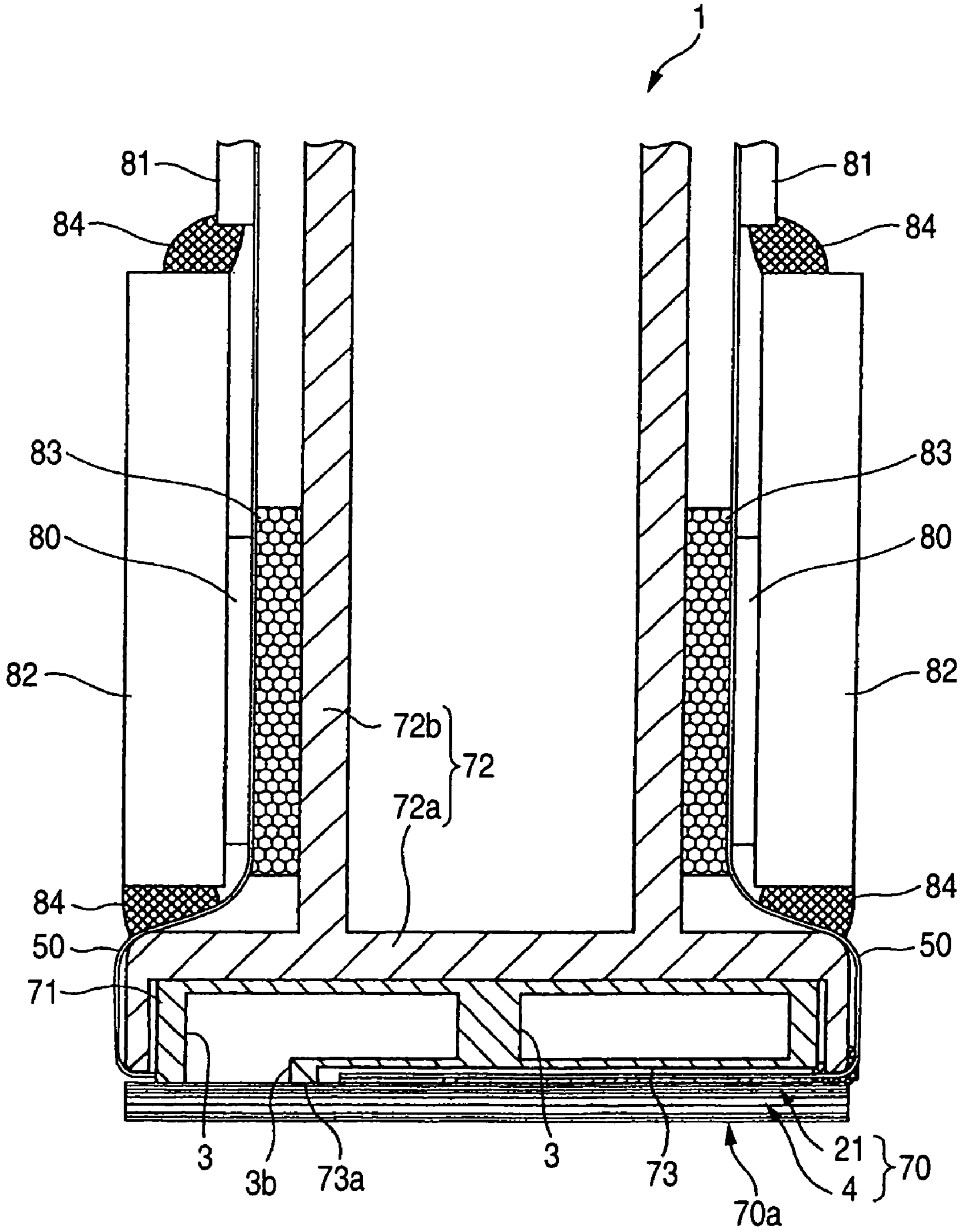
FIG. 2 is a sectional view taken on line II-II in FIG. 1.

FIG. 1 is an outside perspective view of an inkjet head according to the embodiment of the invention. FIG. 2 is a sectional view taken on line II-II in FIG. 1. An inkjet head 1 has a head body 70 for ejecting ink onto paper, and a base block 71 disposed above the head body 70. The head body 70 has a rectangular planar shape extending in a main scanning direction. In the base block 71, two ink reservoirs 3 are formed. The ink reservoirs 3 serve as ink channels from which ink is supplied to the head body 70.

The head body 70 includes a channel unit 4 in which ink channels are formed, and a plurality of actuator units 21 bonded to the upper surface of the channel unit 4 by an epoxy-based thermosetting bonding agent. The channel unit 4 has a configuration in which a plurality of thin sheets are laminated and bonded to one another. The bottom surface of the head body 70 serves as an ink ejection surface 70*a* in which a large number of nozzles 8 (see FIG. 5) each having a very small diameter are arrayed. In addition, a flexible printed circuit (FPC) 50 serving as a feeder member is bonded to the upper surface of each actuator unit 21, and extracted to left or right. In addition, the FPC (flexible cable) 50 is extracted upward while being bent in FIG. 2.

Figure 3:
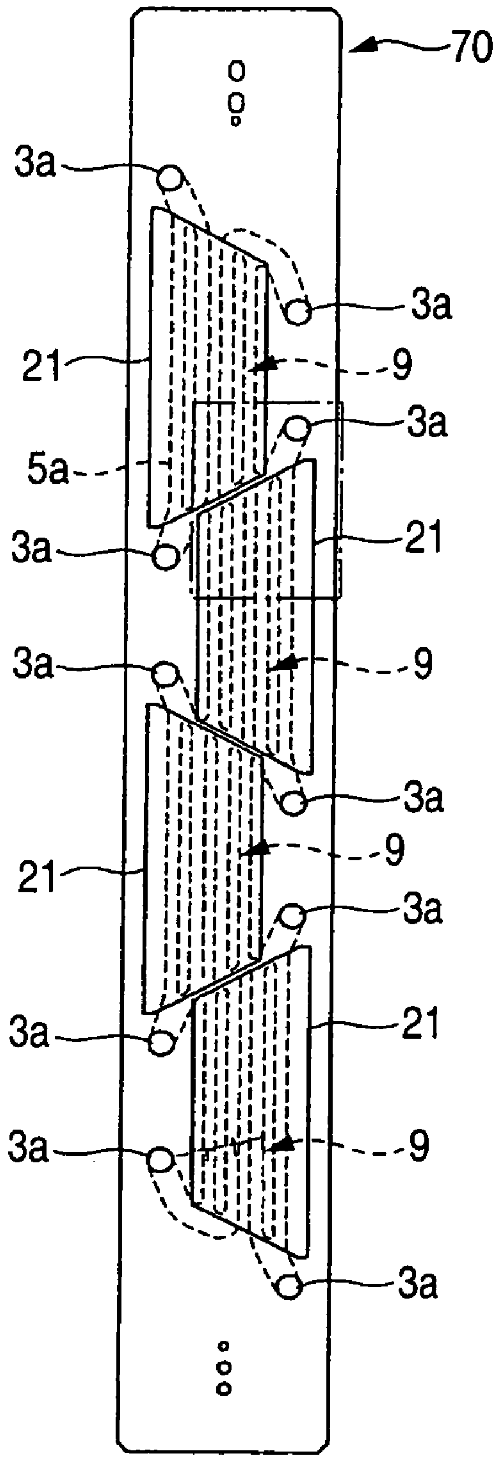
FIG. 3 is a plan view of a head body included in the inkjet head shown in FIG. 1.

FIG. 3 is a plan view of the head body 70. As shown in FIG. 3, the channel unit 4 substantially has a rectangular planar shape extending in one direction (main scanning direction). In FIG. 3, a manifold channel 5 provided in the channel unit 4 and serving as a common ink chamber is depicted by the broken line. Ink is supplied from the ink reservoirs 3 of the base block 71 to the manifold channel 5 through a plurality of openings (ink inlets) 3*a*. The manifold channel 5 branches into a plurality of sub-manifold channels 5*a* extending in parallel to the longitudinal direction of the channel unit 4.

Four actuator units 21 each having a substantial trapezoidal planar shape are bonded to the upper surface of the channel unit 4. The actuator units 21 are arrayed zigzag in two lines so as to avoid the openings 3*a*. Each actuator unit 21 is disposed so that its parallel opposite sides (upper and lower sides) extend in the longitudinal direction of the channel unit 4. The plurality of openings 3*a* are arrayed in two lines in the longitudinal direction of the channel unit 4. Five openings 3*a* in each line, that is, a total often openings 3*a* are provided in positions where the openings 3*a* do not interfere with the actuator units 21. Oblique sides of adjacent ones of the actuator units 21 overlap each other partially in the width direction (sub-scanning direction) of the channel unit 4.

An ink ejection surface 70*a* which is the lower surface of the channel unit 4 opposite to the bonded region of each actuator unit 21 serves as an ink ejection region where a large number of nozzles 8 (see FIG. 5) are arrayed in a matrix. Pressure chamber groups 9 are formed in the upper surface of the channel unit 4 opposite to the actuator units 21. Each pressure chamber group 9 has a large number of pressure chambers 10 (see FIG. 5) arrayed in a matrix. In other words, each actuator unit 21 has dimensions ranging over a large number of pressure chambers 10 constituting one pressure chamber group 9.

Returning to FIG. 2, the base block 71 is made of a metal material such as stainless steel. Each ink reservoir 3 in the base block 71 is a substantially rectangular parallelepiped hollow region formed to extend in the longitudinal direction of the base block 71. Ink from an ink tank (not shown) installed externally is supplied to the ink reservoir 3 through an ink inlet (not shown) provided at one end of the ink reservoir 3, so that the ink reservoir 3 is always filled with the ink. In the ink reservoirs 3, a total of ten openings 3*b* for letting the ink out are arranged in two lines in the extending direction of the ink reservoirs 3. The openings 3*b* are disposed zigzag so as to be connected to the openings 3*a* of the channel unit 4. That is, the ten openings 3*b* of the ink reservoirs 3 are provided with the same positional relationship as the ten openings 3*a* of the channel unit 4.

A lower surface 73 of the base block 71 projects downward near the openings 3*b* in comparison with their circumferences. The base block 71 abuts against the portions of the neighborhoods of the openings 3*a* of the upper surface of the channel unit 4 only in portions 73*a* of the neighborhoods of the openings 3*b* of the lower surface 73. Thus, the region of the lower surface 73 of the base block 71 other than the portions 73*a* of the neighborhoods of the openings 3*b* is separated from the head body 70, and the actuator units 21 are disposed in the separated region.

A holder 72 includes a grip 72*a* for gripping the base block 71, and a pair of projecting portions 72*b* provided at an interval in the sub-scanning direction and projecting upward from the upper surface of the grip 72*a*. The base block 71 is fixedly bonded into a recess portion formed in the lower surface of the grip 72*a* of the holder 72. Each FPC 50 bonded to the corresponding actuator unit 21 is disposed to follow the surface of the corresponding projecting portion 72*b* of the holder 72 through an elastic member 83 of sponge or the like. A driver IC 80 is disposed on the FPC 50 disposed on the surface of the projecting portion 72*b* of the holder 72. That is, the FPC 50 is electrically connected to the actuator unit 21 of the head body 70 and the driver IC 80 by soldering so that a driving signal output from the driver IC 80 can be transmitted to the actuator unit 21.

A substantially rectangular parallelepiped heat sink 82 is disposed in close contact with the outside surface of the driver IC 80 so that heat generated in the driver IC 80 can be dissipated efficiently. Aboard 81 connected to the outside of the FPC 50 is disposed above the driver IC 80 and the heat sink 82. Seal members 84 are put between the upper surface of the heat sink 82 and the board 81 and between the lower surface of the heat sink 82 and the FPC 50 respectively so as to bond the heat sink 82 and the board 81 with each other and bond the heat sink 82 and the FPC 50 with each other. Thus, dust or ink is prevented from invading the body of the inkjet head 1.

Figure 4:
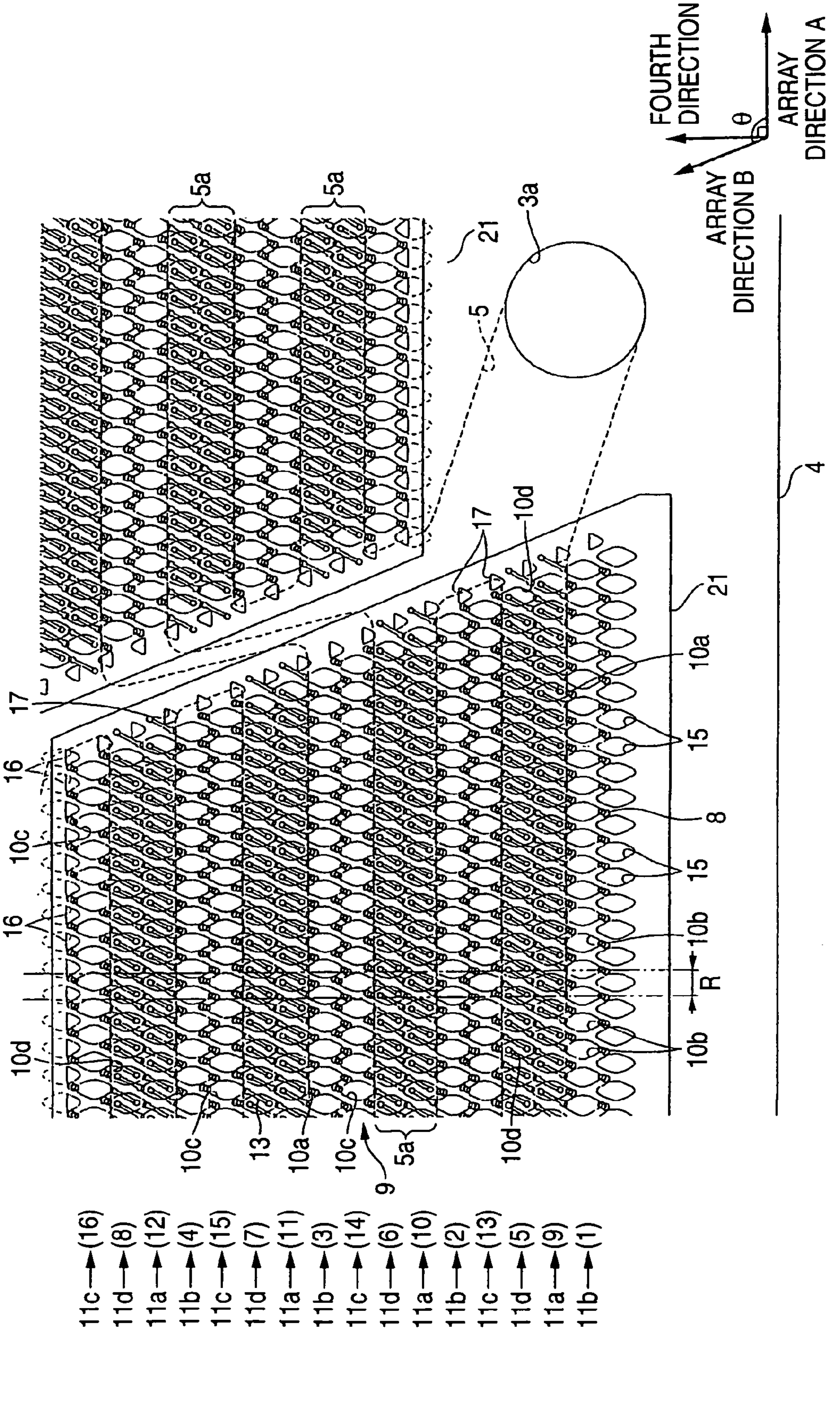
FIG. 4 is an enlarged view of a region surrounded by the one-dot chain lines shown in FIG. 3.
Figure 5:
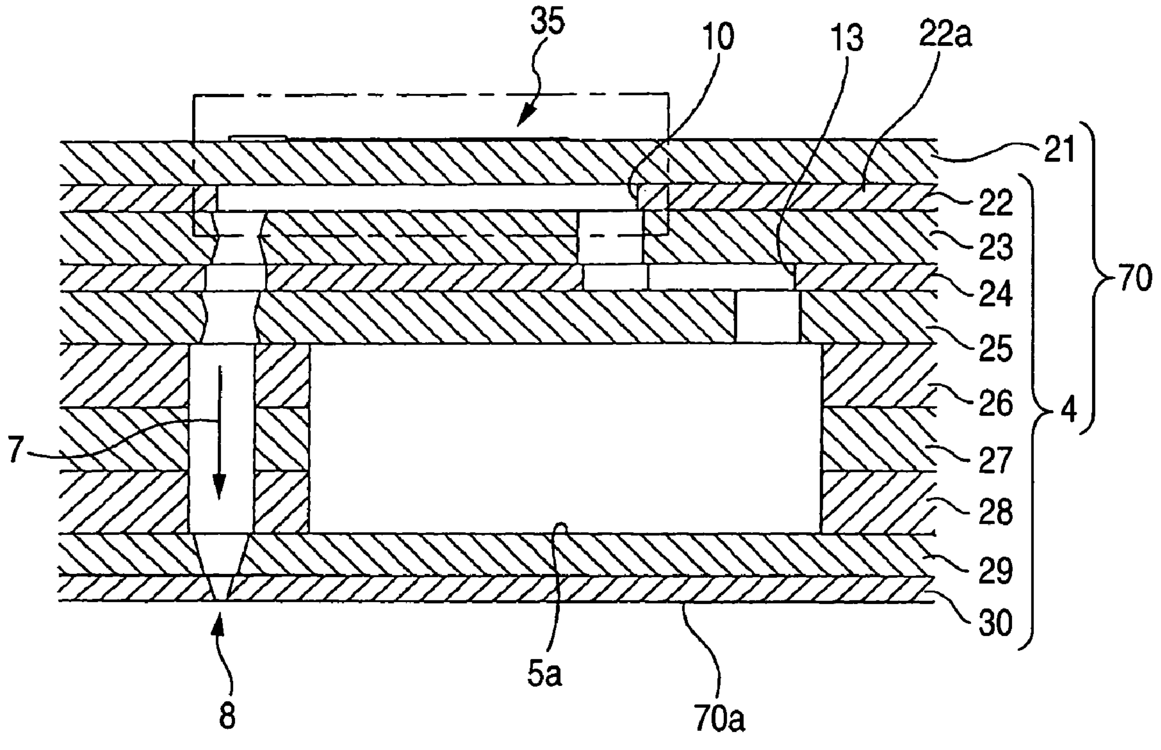
FIG. 5 is a sectional view of a portion of the head body shown in FIG. 3 and opposed to a pressure chamber.

FIG. 4 is an enlarged view of the region surrounded with the one-dot chain line depicted in FIG. 3. As shown in FIG. 4, in the channel unit 4 opposite to each actuator unit 21, four sub-manifold channels 5*a* extend in parallel to the longitudinal direction of the channel unit 4. A large number of individual ink channels 7 (see FIG. 5) are connected to each sub-manifold channel 5*a* so as to communicate with the nozzles 8 respectively. FIG. 5 is a sectional view showing an individual ink channel. As is understood from FIG. 5, each nozzle 8 communicates with the corresponding sub-manifold channel 5*a* through a pressure chamber 10 and an aperture, that is, diaphragm 13. In such a manner, in the head body 70, an individual ink channel 7 is formed for each pressure chamber 10 so as to extend from the outlet of the sub-manifold channel 5*a* to the nozzle 8 through the aperture 13 and the pressure chamber 10.

As is understood from FIG. 5, the head body 70 has a laminated structure in which a total of 10 sheet materials of the actuator units 21, a cavity plate 22, a base plate 23, an aperture plate 24, a supply plate 25, manifold plates 26, 27 and 28, a cover plate 29 and a nozzle plate 30 are laminated in order of increasing distance from the top. Of those sheet materials, the nine plates excluding the plate of the actuator units 21 constitute the channel unit 4.

In each actuator unit 21, four piezoelectric sheets 41-44 (see FIGS. 6A-6B) are laminated, and electrodes are disposed, as will be described in detail later. Of the piezoelectric sheets 41-44, only the uppermost layer is set as a layer (hereinafter referred to as "layer having an active portion" simply) having a portion serving as an active portion when an electric field is applied thereto. The other three layers are set as inactive layers having no active portion. The cavity plate 22 is a metal plate in which a large number of rhomboid holes for forming spaces of the pressure chambers 10 are provided within the range where the actuator unit 21 is pasted. Each interval between the pressure chambers 10 serves as a beam portion 22*a* for supporting the actuator unit 21. The base plate 23 is a metal plate in which, for each pressure chamber 10 of the cavity plate 22, a communication hole between the pressure chamber 10 and the aperture 13 and a communication hole between the pressure chamber 10 and the nozzle 8 are provided.

The aperture plate 24 is a metal plate in which, for each pressure chamber 10 of the cavity plate 22, a communication hole between the pressure chamber 10 and the nozzle 8 is provided in addition to a hole which will serve as the aperture 13. The supply plate 25 is a metal plate in which, for each pressure chamber 10 of the cavity plate 22, a communication hole between the aperture 13 and the sub-manifold channel 5*a* and a communication hole between the pressure chamber 10 and the nozzle 8 are provided. Each of the manifold plates 26, 27 and 28 is a metal plate in which, for each pressure chamber 10 of the cavity plate 22, a communication hole between the pressure chamber 10 and the nozzle 8 is provided in addition to the sub-manifold channel 5*a*. The cover plate 29 is a metal plate in which, for each pressure chamber 10 of the cavity plate 22, a communication hole between the pressure chamber 10 and the nozzle 8 is provided. The nozzle plate 30 is a metal plate in which a nozzle 8 is provided for each pressure chamber 10 of the cavity plate 22. As is apparent from the above description, the channel unit 4 constituted by the aforementioned nine plates 22-30 has a configuration in which the pressure chambers 10 are formed along its upper surface (where the actuator units 21 will be pasted), and the pressure chambers 10 are open in the upper surface.

The ten sheets or plates 21-30 are aligned with and laminated to one another so that individual ink channels 7 are formed as shown in FIG. 5. Each individual ink channel 7 first leaves upward from the sub-manifold channel 5*a* and extends horizontally in the aperture 13. Then the individual ink channel 7 goes upward again from the aperture 13 and extends horizontally in the pressure chamber 10 again. After that, the individual ink channel 7 turns obliquely downward for a while in a direction to leave the aperture 13, and then turns vertically downward so as to approach the nozzle 8. In this embodiment, the nine plates constituting the channel unit 4 are made from one and the same metal material. As the metal material, SUS430 is used.

As is apparent from FIG. 5, the pressure chambers 10 and the apertures 13 are provided on different levels in the laminated direction of the respective plates. Consequently, in the channel unit 4 opposite to each actuator unit 21, as shown in FIG. 4, an aperture 13 communicating with one pressure chamber 10 can be disposed in a position where it overlaps another pressure chamber 10 adjacent to the one pressure chamber 10 in plan view. As a result, the pressure chambers 10 are brought into close contact with one another and arrayed with high density. Thus, high-resolution image printing can be attained by the inkjet head 1 occupying a comparatively small area.

Refer to FIG. 4 again. A pressure chamber group 9 composed of a large number of pressure chambers 10 is formed within a range where each actuator unit 21 is attached in the upper surface of the channel unit 4. The pressure chamber group 9 has a trapezoidal shape substantially as large as the range where the actuator unit 21 is attached. Such a pressure chamber group 9 is formed for each actuator unit 21.

As is apparent from FIG. 4, each pressure chamber 10 belonging to the pressure chamber group 9 is made to communicate with its corresponding nozzle 8 at one end of its long diagonal, and to communicate with the sub-manifold channel 5*a* through the aperture 13 at the other end of the long diagonal. As will be described later, individual electrodes 35 (see FIGS. 6A-6B) are arrayed in a matrix on the actuator unit 21 so as to be opposed to the pressure chambers 10 respectively. Each individual electrode 35 has a rhomboid shape in plan view and is one size smaller than the pressure chamber 10. Incidentally, in FIG. 4, the nozzles 8, the pressure chambers 10, the apertures 13, etc. which should be depicted by broken lines because they are located in the channel unit 4 are depicted by real lines in order to making the drawing understood easily.

The pressure chambers 10 are disposed contiguously in a matrix in two directions, that is, an array direction A (first direction) and an array direction B (second direction). The array direction A is the longitudinal direction of the inkjet head 1, that is, the direction in which the channel unit 4 extends. The array direction A is parallel to the short diagonal of each pressure chamber 10. The array direction B is a direction of one oblique side of each pressure chamber 10, which is at an obtuse angle θ with the array direction A. The two acute angle portions of each pressure chamber 10 are located between two adjacent pressure chambers.

The pressure chambers 10 disposed contiguously in a matrix in the two directions, that is, the array direction A and the array direction B, are separated at an equal distance corresponding to 37.5 dpi from each other in the array direction A. In each actuator unit 21, sixteen pressure chambers 10 are arranged in the array direction B.

The large number of pressure chambers 10 disposed in a matrix form a plurality of pressure chamber arrays in parallel to the array direction A shown in FIG. 4. The pressure chamber arrays are divided into a first pressure chamber array 11*a*, a second pressure chamber array 11*b*, a third pressure chamber array 11*c* and a fourth pressure chamber array 11*d* in accordance with their relative positions to the sub-manifold channel 5*a* in view from a direction (third direction) perpendicular to the plane of FIG. 4. Four sets of the first to fourth pressure chamber arrays 11*a*-11*d* are disposed periodically in order of 11*c*, 11*d*, 11*a*, 11*b*, 11*c*, 11*d*, . . . , 11*b* from the upper side of the actuator unit 21 toward the lower side thereof.

In the pressure chambers 10*a* forming the first pressure chamber array 11*a* and the pressure chambers 10*b* forming the second pressure chamber array 11*b*, the nozzles 8 are unevenly distributed on the lower side of the plane of FIG. 4 with respect to a direction (fourth direction) perpendicular to the array direction A in view from the third direction. Each nozzle 8 is opposite to the vicinity of the lower end portion of its corresponding pressure chamber 10. On the other hand, in the pressure chambers 10*c* forming the third pressure chamber array 11*c* and the pressure chambers 10*d* forming the fourth pressure chamber array 11*d*, the nozzles 8 are unevenly distributed on the upper side of the plane of FIG. 4 with respect to the fourth direction. Each nozzle 8 is opposite to the vicinity of the upper end portion of its corresponding pressure chamber 10. In each of the first and fourth pressure chamber arrays 11*a* and 11*d*, at least half the region of each pressure chamber 10*a*, 10*d* overlaps the sub-manifold channel 5*a* in view from the third direction. In each of the second and third pressure chamber arrays 11*b* and 11*c*, almost all the region of each pressure chamber 10*b*, 10*c* does not overlap the sub-manifold channel 5*a* in view from the third direction. Accordingly, in any pressure chamber 10 belonging to any pressure chamber array, the width of the sub-manifold channel 5*a* can be made as wide as possible so as to supply ink to each pressure chamber 10 smoothly while the nozzle 8 communicating with the pressure chamber 10 is prevented from overlapping the sub-manifold channel 5*a*.

As shown in FIG. 4, a large number of circumferential spaces 15 each having the same shape and the same size as each pressure chamber 10 are arrayed in a straight line all over the long side of the paired parallel sides of the trapezoid of each pressure chamber group 9 in the head body 70. The circumferential spaces 15 are defined by closing holes formed in the cavity plate 22 by the actuator unit 21 and the base plate 23, each of the holes having the same shape and the same size as each pressure chamber 10. That is, no ink channel is connected to any circumferential space 15, and no individual electrode 35 to be opposed is provided in any circumferential space 15. That is, there is no case that any circumferential space 15 is filled with ink.

On the other hand, a large number of circumferential spaces 16 are arrayed in a straight line all over the short side of the paired parallel sides of the trapezoid of each pressure chamber group 9 in the head body 70. Further, in the head body 70, a large number of circumferential spaces 17 are arrayed in a straight line all over each oblique side of the trapezoid of each pressure chamber group 9. Each of the circumferential spaces 16 and 17 penetrates the cavity plate 22 in a region of an equilateral triangle in plan view. No ink channel is connected to any circumferential space 16, 17, and no individual electrode 35 to be opposed is provided in any circumferential space 16, 17. That is, in the same manner as the circumferential spaces 15, there is no case that any circumferential space 16, 17 is filled with ink.

Next, description will be made about the configuration of each actuator unit 21. A large number of individual electrodes 35 are disposed in a matrix on the actuator unit 21 so as to have the same pattern as the pressure chambers 10. Each individual electrode 35 is disposed in a position where the individual electrode 35 faces its corresponding pressure chamber 10 in plan view.

Figure 6A:
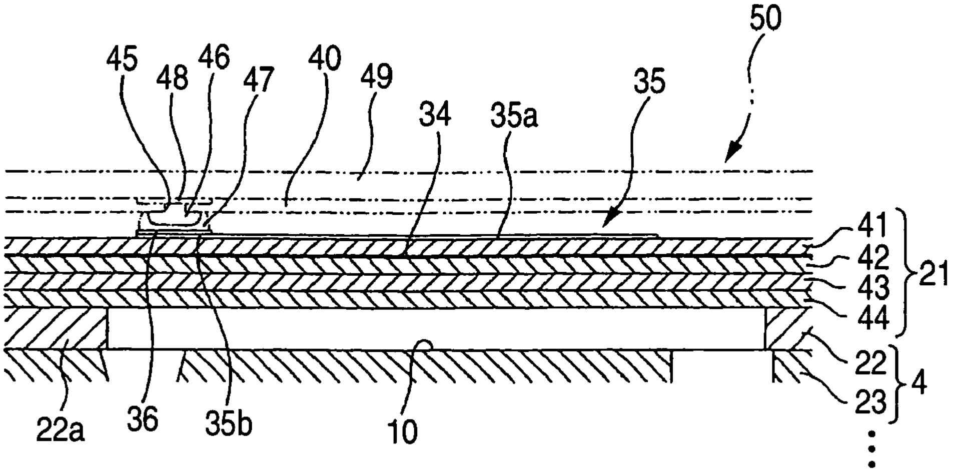
FIGS. 6A-6*c* shows an actuator unit.
Figure 6B:
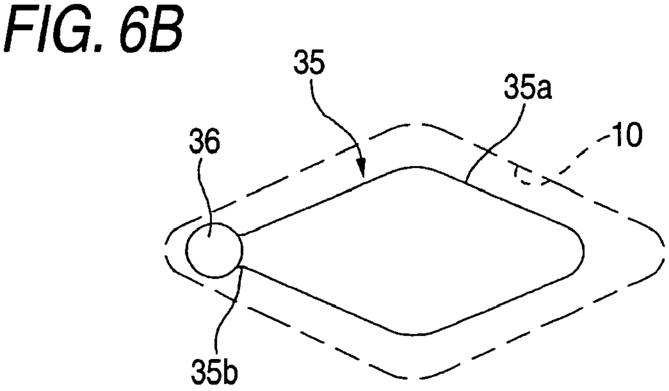
Figure 6C:
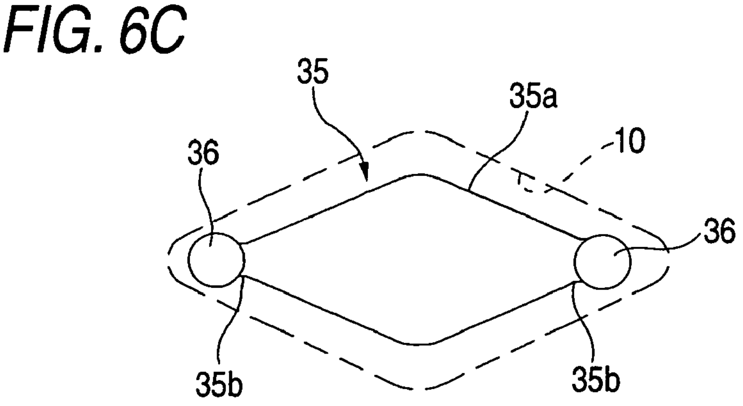

FIGS. 6A, 6B and 6C show an actuator unit. FIG. 6A is an enlarged view of the portion surrounded with the one-dot chain line in FIG. 5, and FIG. 6B is a plan view of an individual electrode. In FIG. 6A, the FPC 50 electrically connected to each individual electrode 35 is depicted by the two-dot chain line. As shown in FIGS. 6A-6C, the individual electrode 35 is constituted by a primary electrode region 35*a* and a secondary electrode region 35*b*. The primary electrode region 35*a* is disposed in a position where the primary electrode region 35*a* overlaps the pressure chamber 10, so that the primary electrode region 35*a* is received in the planar region of the pressure chamber 10 in plan view. The secondary electrode region 35*b* is connected to the primary electrode region 35*a* and received in the planar region of the pressure chamber 10.

As shown in FIG. 6A, the actuator unit 21 includes four piezoelectric sheets 41, 42, 43 and 44 formed to have one and the same thickness of about 15 μm. The piezoelectric sheets 41-44 are formed as continuous lamellar flat plates (continuous flat plate layers) to be disposed over a large number of pressure chambers 10 formed within one ink ejection region in the head body 70. When the piezoelectric sheets 41-44 are disposed as continuous flat plate layers over a plurality of pressure chambers 10, the individual electrodes 35 can be disposed on the piezoelectric sheet 41 with high density, for example, by use of a screen printing technique. Accordingly, the pressure chambers 10 to be formed in positions corresponding to the individual electrodes 35 can be also disposed with high density. Thus, high-resolution images can be printed. The piezoelectric sheets 41-44 are made of a lead zirconate titanate (PZT) based ceramics material having ferroelectricity.

The primary electrode region 35*a* of each individual electrode 35 formed on the piezoelectric sheet 41 which is the uppermost layer substantially has a rhomboid planar shape which is substantially similar to the pressure chamber 10, as shown in FIG. 6B. An acute angle portion on the left side of FIG. 6B in the rhomboid primary electrode region 35*a* is extended to a region where the acute angle portion overlaps an acute angle portion of the pressure chamber 10, and connected to the secondary electrode region 35*b*. The secondary electrode region 35*b* has a circular land portion 36 which has a smaller planar area than the planar area of the primary electrode region 35*a* and which is disposed to cover almost all the planar shape of the secondary electrode region 35*b*. The land portion 36 is opposed to one acute angle portion of the pressure chamber 10 in the cavity plate 22. The land portion 36 is, for example, made of gold containing glass frit. The land portion 36 is electrically connected onto the surface of the secondary electrode portion 35*b* as shown in FIG. 6A. In such a manner, according to the embodiment, each individual electrode 35 as a whole is formed to face its corresponding pressure chamber 10. According to this configuration, each individual electrode 35 is more evenly separated from the surrounding pressure chambers 10. As shown in FIG. 6C, individual electrode 35 formed on the piezoelectric sheet 41 which is the uppermost layer may have two land portions 36 in an acute angle portion on both sides of FIG. 6C in the rhomboid primary electrode region 35*a*.

A common electrode 34 having the same contour as the piezoelectric sheet 41 and having a thickness of about 2 μm is put between the piezoelectric sheet 41 which is the uppermost layer and the piezoelectric sheet 42 which is under the piezoelectric sheet 41. The individual electrodes 35 and the common electrode 34 are made of a metal material such as Ag—Pd based metal material.

The common electrode 34 is grounded in a not-shown region. Consequently, the common electrode 34 is kept in constant potential or the ground potential in this embodiment equally over all the regions corresponding to all the pressure chambers 10.

As shown in FIG. 6A, the FPC 50 includes a base film 49, a conductor pattern 48 formed in the lower surface of the base film 49, and a cover film 40 covering almost all the lower surface of the base film 49. The base film 49 is about 25 μm thick, the conductor pattern 48 is about 9 μm thick, and the cover film 40 is about 20 μm thick. In the cover film 40, a plurality of through holes 45 are formed respectively correspondingly to the plurality of traces which form conductor patterns 48. Each through hole 45 has a smaller diameter than a width of trace which forms conductor pattern 48. The base film 49, the conductor pattern 48 and the cover film 40 are aligned with and laminated to one another so that the center of each through hole 45 corresponds to the center of each trace, while the outer circumferential edge portion of the trace is covered with the cover film 40. Terminals 46 of the FPC 50 are connected to the conductor pattern 48 through the through holes 45 respectively.

Each of the base film 49 and the cover film 40 is a sheet member having an insulating property. In this embodiment, the base film 49 is made from polyimide resin, and the cover film 40 is made from a photosensitive material. When the cover film 40 is made thus from a photosensitive material, it becomes easy to form the large number of through holes 45.

The conductor pattern 48 is made from copper foil. The conductor pattern 48 is formed of wires (traces) connected to the driver IC 80 and forming a predetermined pattern in the lower surface of the base film 49.

The terminals 46 are made from a conductive material such as nickel. Each terminal 46 is formed to close its corresponding through hole 45, and cover the outer circumferential edge of the through hole 45 in the lower surface of the cover film 40. The terminal 46 is formed to be convex toward the piezoelectric sheet 41. The diameter of each terminal 46 is about 50 μm, and the thickness thereof from the lower surface of the cover film 40 is about 30 μm.

The FPC 50 includes a large number of terminals 46. Each terminal 46 is designed to correspond to one land portion 36. Accordingly, each individual electrode 35 electrically connected to its corresponding land portion 36 is independently connected to the driver IC 80 through an conductor pattern 48 in the FPC 50. Thus, the potential of each pressure chamber 10 can be controlled individually.

Next, description will be made about a method for driving each actuator unit 21. The piezoelectric sheet 41 in the actuator unit 21 has a polarizing direction in the thickness direction thereof. That is, the actuator unit 21 has a so-called unimorph type configuration in which one piezoelectric sheet 41 on the upper side (that is, distant from the pressure chambers 10) is set as a layer where an active portion exists, while three piezoelectric sheets 42-44 on the lower side (that is, close to the pressure chambers 10) are set as inactive layers. Accordingly, when the individual electrodes 35 are set at positive or negative predetermined potential, each electric-field-applied portion between electrodes in the piezoelectric sheet 41 will act as an active portion (pressure generating portion) so as to contract in a direction perpendicular to the polarizing direction due to piezoelectric transversal effect, for example, if an electric field is applied in the same direction as the polarization.

In this embodiment, a portion between each individual electrode 35 and the common electrode 34 in the piezoelectric sheet 41 acts as an active portion which will generate a strain due to piezoelectric effect when an electric field is applied thereto. On the other hand, no electric field is applied from the outside to the three piezoelectric sheets 42-44 under the piezoelectric sheet 41. Therefore, the three piezoelectric sheets 42-44 hardly serve as active portions. As a result, mainly the portion between each primary electrode region 35*a* and the common electrode 34 in the piezoelectric sheet 41 contracts in a direction perpendicular to the polarizing direction due to piezoelectric transversal effect.

On the other hand, since the piezoelectric sheets 42-44 are not affected by any electric field, they are not displaced voluntarily. Therefore, between the piezoelectric sheet 41 on the upper side and the piezoelectric sheets 42-44 on the lower side, there occurs a difference in strain in a direction perpendicular to the polarizing direction, so that the piezoelectric sheets 41-44 as a whole intend to be deformed to be convex on the inactive side (unimorph deformation). In this event, as shown in FIG. 6A, the lower surface of the actuator unit 21 constituted by the piezoelectric sheets 41-44 is fixed to the upper surface of the diaphragm (cavity plate) 22 which defines the pressure chambers. Consequently, the piezoelectric sheets 41-44 are deformed to be convex on the pressure chamber side. Accordingly, the volume of each pressure chamber 10 is reduced so that the pressure of ink increases. Thus, the ink is ejected from the corresponding nozzle 8. After that, when the individual electrodes 35 are restored to the same potential as the common electrode 34, the piezoelectric sheets 41-44 are restored to their initial shapes so that the volume of each pressure chamber 10 is restored to its initial volume. Thus, the pressure chamber 10 sucks ink from the sub-manifold channel 5*a*.

According to another driving method, each individual electrode 35 may be set at potential different from the potential of the common electrode 34 in advance. In this method, the individual electrode 35 is once set at the same potential as the common electrode 34 whenever there is an ejection request. After that, the individual electrode 35 is set at potential different from the potential of the common electrode 34 again at predetermined timing. In this case, the piezoelectric sheets 41-44 are restored to their initial shapes at the same timing when the individual electrode 35 has the same potential as that of the common electrode 34. Thus, the volume of the pressure chamber 10 increases in comparison with its initial volume (in the state where the individual electrode 35 and the common electrode 34 are different in potential), so that ink is sucked into the pressure chamber 10 from the sub-manifold channel 5*a*. After that, the piezoelectric sheets 41-44 are deformed to be convex on the pressure chamber 10 side at the timing when the individual electrode 35 is set at different potential from that of the common electrode 34 again. Due to reduction in volume of the pressure chamber 10, the pressure on ink increases so that the ink is ejected.

Refer to FIG. 4 again, and described will be a belt-like region R having a width (678.0 μm) corresponding to 37.5 dpi in the array direction A and extending in a direction (fourth direction) perpendicular to the array direction A. In the belt-like region R, only one nozzle 8 is present in any array of the sixteen pressure chamber arrays 11*a*-11*d*. That is, when such a belt-like region R is defined in any position within an ink ejection region corresponding to one actuator unit 21, sixteen nozzles 8 are always distributed in the belt-like region R. The positions of dots obtained by projecting the sixteen nozzles 8 onto a straight line extending in the array direction A are separated at equal intervals corresponding to 600 dpi, which is a resolution in printing.

Assume that sixteen nozzles 8 belonging to one belt-like region R are numbered (1) to (16) respectively in order of increasing distance from the left end of dots obtained by projecting the sixteen nozzles 8 on to the straight line extending in the array direction A. The sixteen nozzles 8(1), (9), (5), (13), (2), (10), (6), (14), (3), (11), (7), (15), (4), (12), (8) and (16) are arranged in order of increasing distance from the bottom. In the inkjet head 1 configured thus, the actuator units 21 are driven suitably in accordance with the conveyance of a printing medium. Thus, characters, graphics, etc. can be drawn with a resolution of 600 dpi.

By way of example, description will be made about a case where a straight line extending in the array direction A is printed with a resolution of 600 dpi. First, description will be made briefly about the case of a reference example in which each nozzle 8 communicates with a corresponding-side acute angle portion of its corresponding pressure chamber 10. In this case, in accordance with conveyance of a printing medium, a nozzle 8 in a pressure chamber array located at the bottom in FIG. 4 begins to eject ink, and nozzles 8 belonging to the next pressure chamber arrays on the upper side are selected sequentially so as to eject ink. Thus, ink dots are formed contiguously at equal intervals of 600 dpi in the array direction A. Finally, a straight line extending in the array direction A is drawn with a resolution of 600 dpi as a whole.

On the other hand, in this embodiment, a nozzle 8 in the pressure chamber array 11*b* located at the bottom in FIG. 4 begins to eject ink, and nozzles 8 communicating with the next pressure chambers on the upper side are selected sequentially in accordance with the conveyance of the printing medium, so as to eject ink. In this event, the displacement of the nozzle position in the array direction A whenever the selected pressure chamber array is moved from the lower side to the upper side one by one is not fixed. Accordingly, the intervals between ink dots formed sequentially in the array direction A in accordance with the conveyance of the printing medium are not fixed to 600 dpi.

That is, as shown in FIG. 4, in accordance with the conveyance of the printing medium, ink is ejected first from the nozzle 8(1) communicating with the pressure chamber array 11*b* at the bottom in FIG. 4, so that a dot array is formed on the printing medium at an interval corresponding to 37.5 dpi. After that, in accordance with the conveyance of the printing medium, the position where a straight line should be formed reaches the position of the nozzle 8(9) communicating with the second pressure chamber array 11*a* from the bottom, and ink is ejected from the nozzle 8(9). As a result, a second ink dot is formed in a position displaced from the first formed dot position in the array direction A by a distance eight times as long as a distance corresponding to 600 dpi.

Next, in accordance with the conveyance of the printing medium, the position where a straight line should be formed reaches the position of the nozzle 8(5) communicating with the third communication chamber array 11*d* from the bottom, and ink is ejected from the nozzle 8(5). As a result, a third ink dot is formed in a position displaced from the first formed dot position in the array direction A by a distance four times as long as a distance corresponding to 600 dpi. Further, in accordance with the conveyance of the printing medium, the position where a straight line should be formed reaches the position of the nozzle 8(13) communicating with the fourth pressure chamber array 11*c* from the bottom, and ink is ejected from the nozzle 8 (13). As a result, a fourth ink dot is formed in a position displaced from the first formed dot position in the array direction A by a distance twelve times as long as a distance corresponding to 600 dpi. Further, in accordance with the conveyance of the printing medium, the position where a straight line should be formed reaches the position of the nozzle 8(2) communicating with the fifth pressure chamber array 11*b* from the bottom, and ink is ejected from the nozzle 8(2). As a result, a fifth ink dot is formed in a position displaced from the first formed dot position in the array direction A by a distance corresponding to 600 dpi.

In the same manner as described above, the nozzles 8 are selected in turn from one communicating with a pressure chamber 10 located on the lower side in FIG. 4 to one communicating with a pressure chamber 10 located on the upper side in FIG. 4, so that ink dots are formed. In this event, on the assumption that N designates the number suffixed to each nozzle 8 shown in FIG. 4, the nozzle 8(N) forms an ink dot in a position displaced from the first formed dot position in the array direction A by a distance corresponding to (scale n=N−1)×(distance corresponding to 600 dpi). When the selection of the sixteen nozzles 8 is terminated finally, the ink dots formed at an interval corresponding to 37.5 dpi by the nozzle 8(1) in the pressure chamber array 11*b* at the bottom in FIG. 4 are connected through 15 dots formed at intervals corresponding to 600 dpi. Thus, a straight line extending in the array direction A can be drawn with a resolution of 600 dpi as a whole.

Incidentally, each of the neighborhoods of the opposite end portions (oblique sides of the actuator unit 21) in the array direction A of each ink ejection region has a complementary relation to the neighborhood of an opposed one of the opposite end portions in the array direction A of an ink ejection region corresponding to another actuator unit 21 opposed in the width direction of the head body 70. Thus, printing with a resolution of 600 dpi can be performed.

In the inkjet head 1 configured thus, each individual electrode 35 is entirely opposed to its corresponding pressure chamber 10. Accordingly, the secondary electrode region 35*b* of each individual electrode 35 is disposed in a position comparatively distant from pressure chambers 10 adjacent to the pressure chamber 10 corresponding to the individual electrode 35 in comparison with the case where the secondary electrode region 35*b* of the individual electrode 35 is extended onto the beam portion 22*a* which surrounds the pressure chamber. Therefore, when a driving voltage is supplied from the FPC 50 to an individual electrode 35 through its land portion 36, direct deformation of the piezoelectric sheets 41-44 due to the driving voltage occurs only in a region overlapping the individual electrode 35. Thus, the influence on a change in volume of each pressure chamber 10 adjacent to the individual electrode 35 can be reduced. In addition, due to the configuration in which each individual electrode 35 is more evenly separated from the surrounding pressure chambers 10, the influence on a pressure chamber 10 having a specific positional relationship to the individual electrode 35 can be reduced. As a result, it is possible to reduce structural crosstalk in which vibration of piezoelectric sheets 41-44 caused by the individual electrode 35 gives the surrounding pressure chambers a bad influence on their ink ejection properties. Thus, it is possible to equalize the volumes or velocities of ink droplets to be ejected.

In addition, the secondary electrode region 35*b* is formed in a planar area smaller than the planar area of the primary electrode region 35*a*. Accordingly, the displacement of the piezoelectric sheets 41-44 opposed to the primary electrode region 35*a* becomes difficult to block. That is, the secondary electrode region 35*b* is provided with the land portion 36, and the land portion 36 is bonded to the terminal 46 of the FPC 50 by soldering. When the planar area of the secondary electrode region 35*b* is increased and the planar area of the land portion 36 is also increased, the displacement of the piezoelectric sheets 41-44 opposed to the primary electrode region 35*a* for substantially changing the volume of the pressure chamber 10 will be reduced due to the influence of the solder bonding the land portion 36 with the terminal 46. According to the invention, however, the planar area of the secondary electrode region 35*b* is made smaller than the planar area of the primary electrode region 35*a* so that the influence of the solder hardly appears. Accordingly, the displacement of the piezoelectric sheets 41-44 opposed to the primary electrode region 35*a* is not blocked, but the efficiency in changing the volume of the pressure chamber 10 increases. Moreover, the secondary electrode region 35*b* is disposed in a position opposed to an acute angle portion of the pressure chamber 10. It is therefore possible to dispose the primary electrode region 35*a* in a position opposed to a central region easy to contribute to the change in volume of the pressure chamber 10. Thus, reduction in displacement of the piezoelectric sheets 41-44 opposed to the primary electrode region 35*a* can be suppressed effectively.

Figure 7:
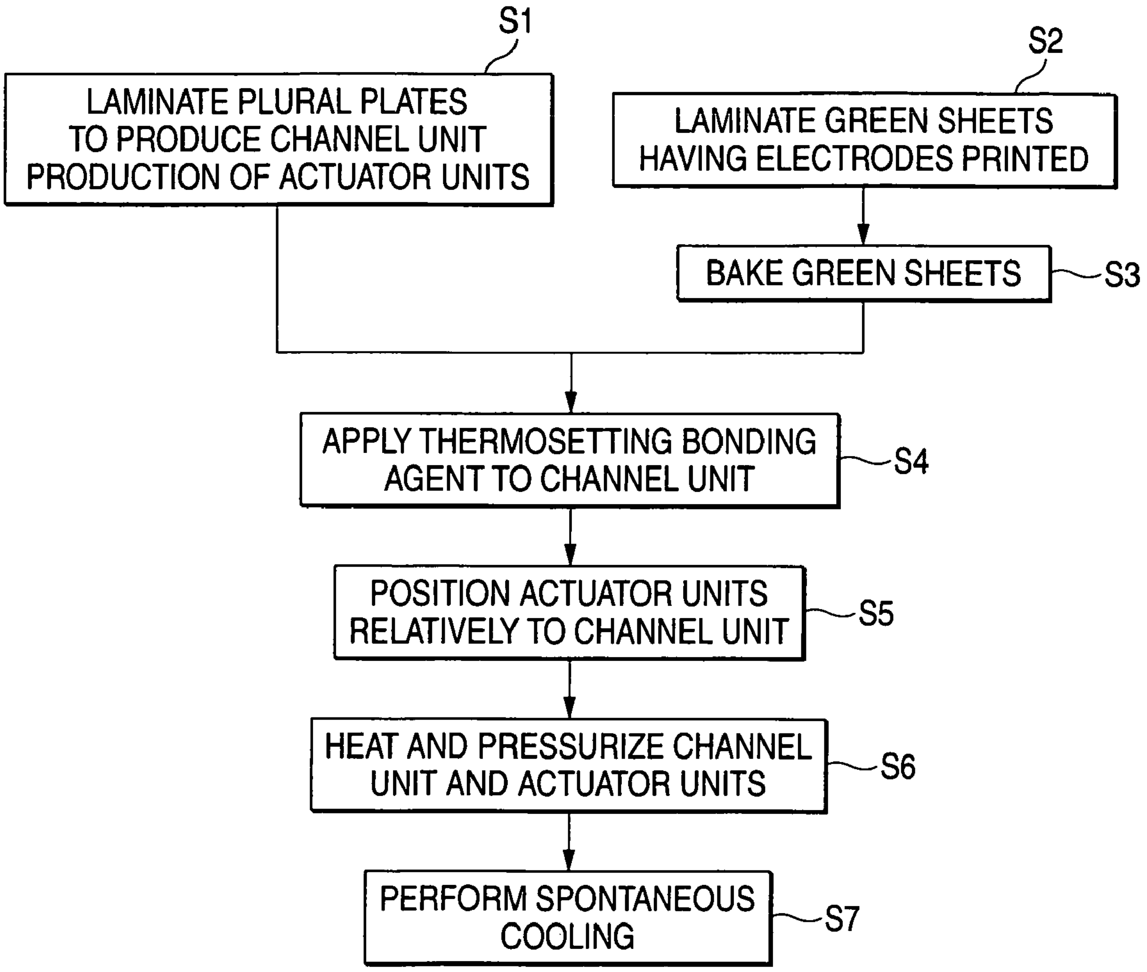
FIG. 7 is a flow chart for manufacturing an inkjet head according to an embodiment of the invention.
Figure 8:
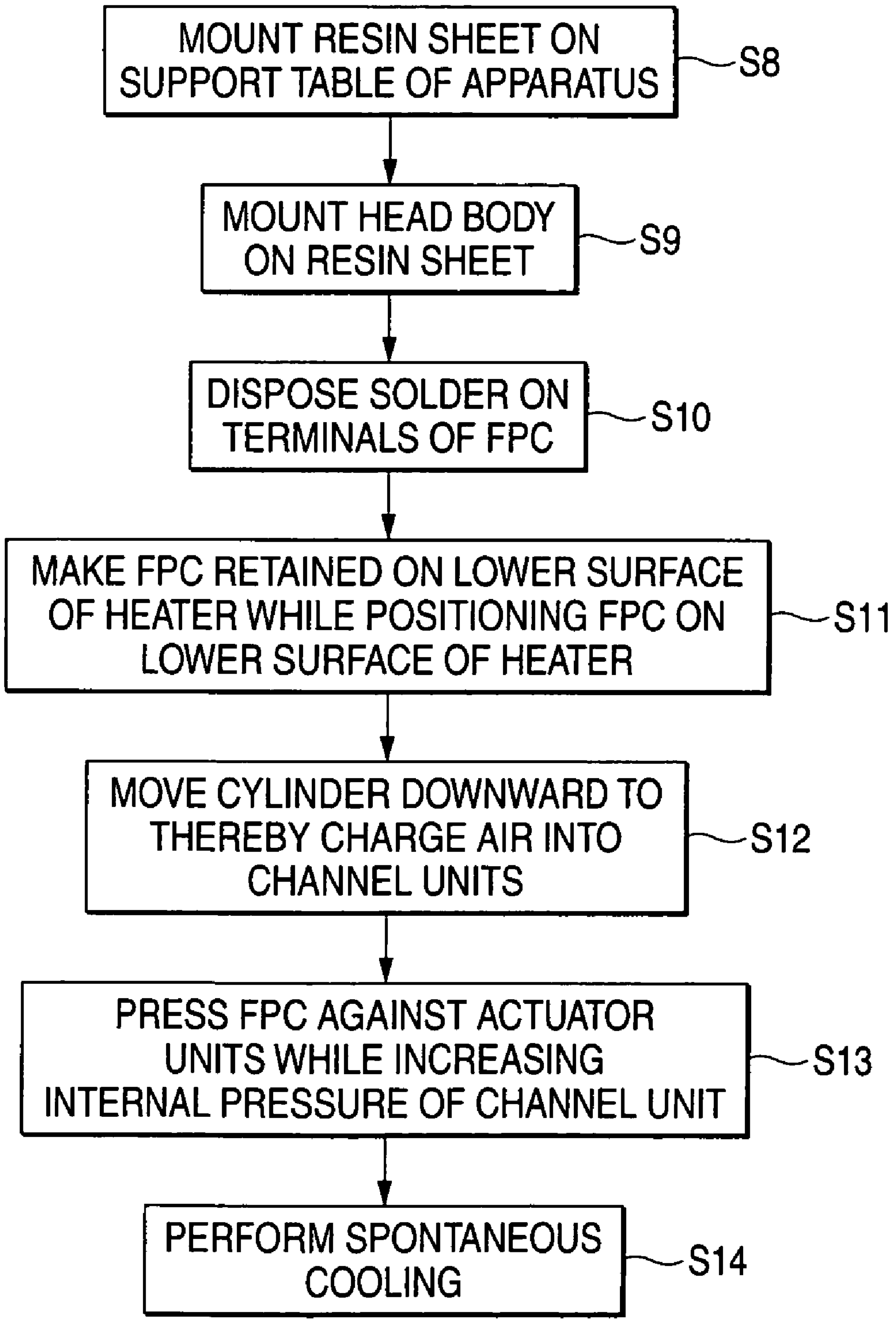
FIG. 8 is a flow chart for manufacturing the inkjet head according to the embodiment of the invention.
Figure 9:
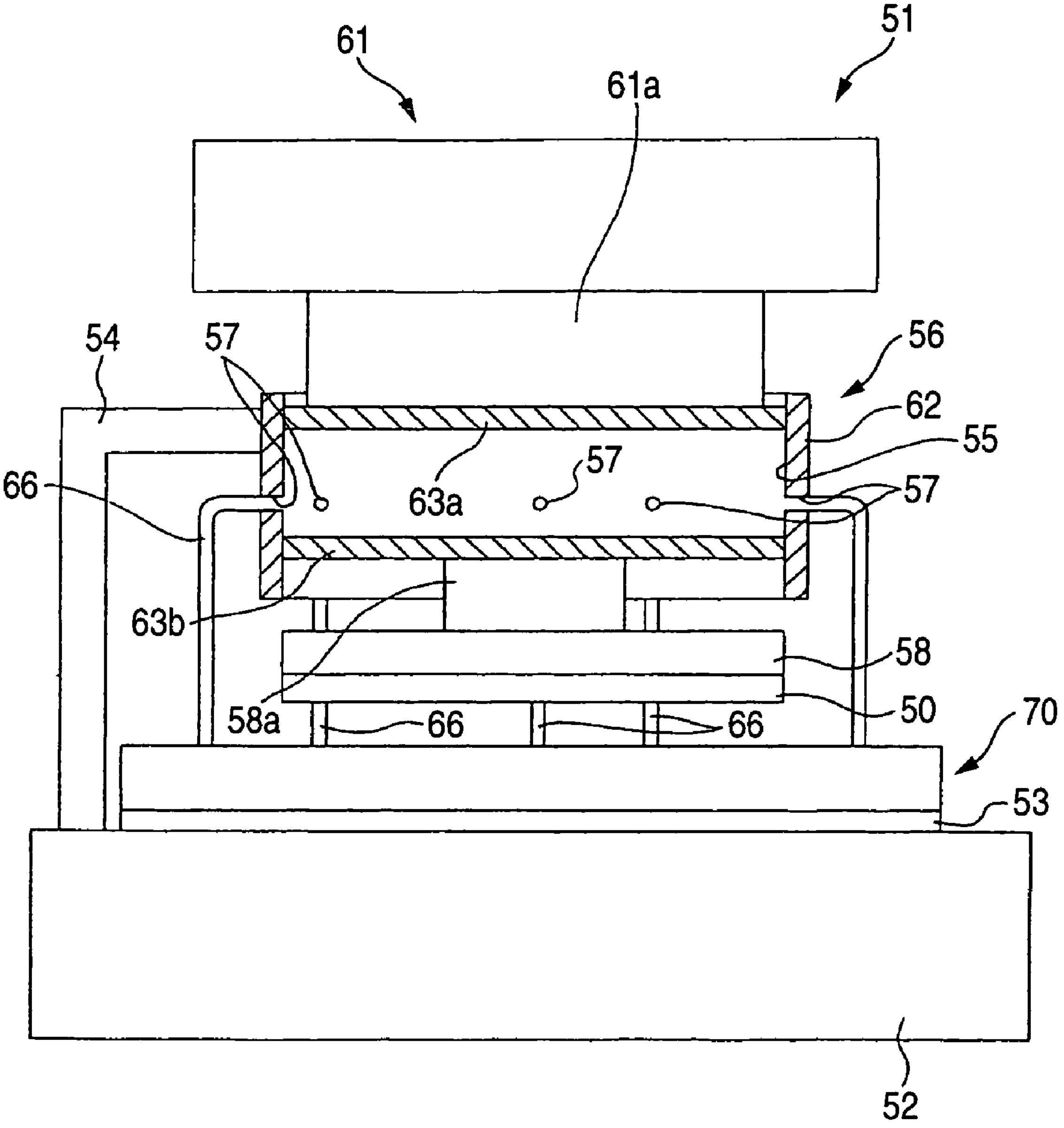
FIG. 9 is a schematic configuration view of apparatus for bonding actuator units of the head body to an FPC in the inkjet head according to the embodiment of the invention.
Figure 10A:
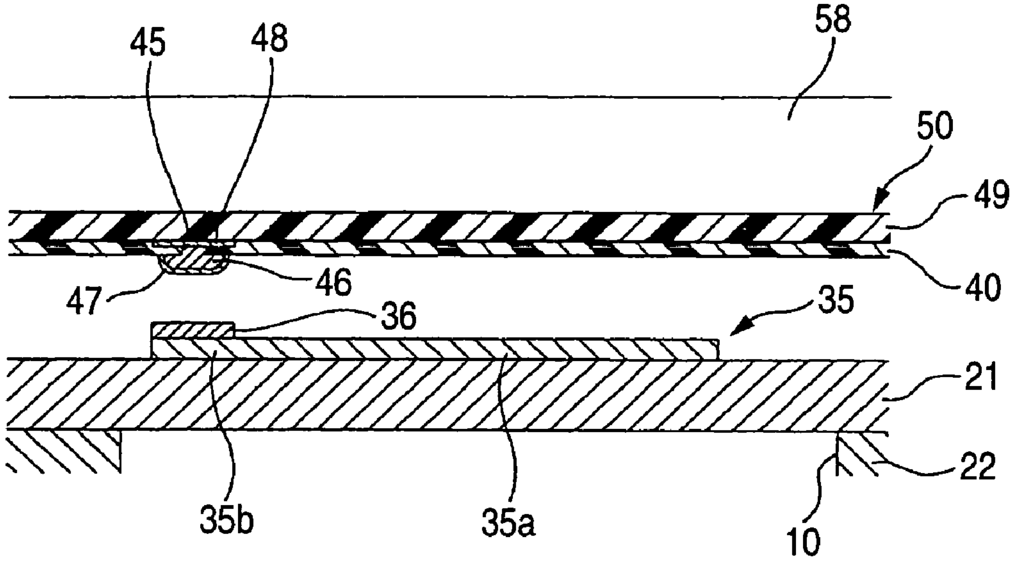
FIG. 10 is a view showing the state where the FPC is bonded to each individual electrodes in a method for manufacturing an inkjet head according to the embodiment of the invention.
Figure 10B:
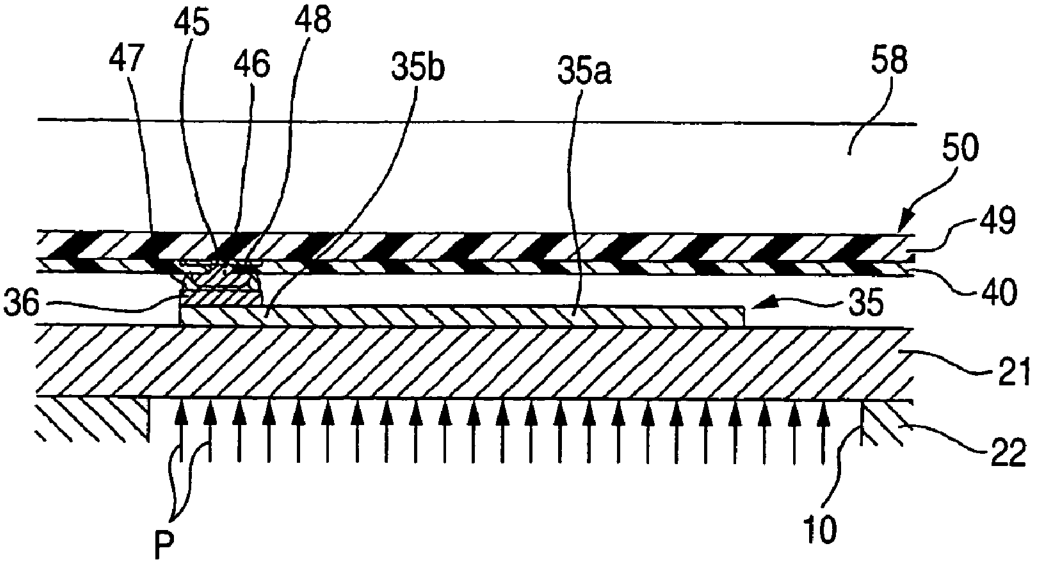

Next, a method for manufacturing the aforementioned inkjet head 1 will be described with reference to FIGS. 7-9 and 10A-10B. FIGS. 7 and 8 are flow charts for manufacturing the inkjet head 1. FIG. 9 is a schematic configuration view of apparatus for bonding each actuator unit 21 of the head body 70 to the FPC 50. FIG. 10A is a view showing a state before the FPC and the land portion are bonded in a method for manufacturing an inkjet head according to an embodiment of the invention. FIG. 10B is a view showing a state after the FPC and the land portion are bonded.

To manufacture the inkjet head 1, parts of the channel unit 4, the actuator units 21, etc. are produced separately, and the parts are then assembled. First, in Step 1 (S1), the channel unit 4 is produced. To produce the channel unit 4, etching is performed on each plate 22-30 constituting the channel unit 4, using a patterned photo-resist as a mask. Thus, holes are formed in the respective plates 22-30 as shown in FIG. 5. After that, the nine plates 22-30 aligned to form the individual ink channels 7 are laid on one another through an epoxy-based thermosetting bonding agent. The nine plates 22-30 are pressurized and heated to a temperature not lower than the setting temperature of the thermosetting bonding agent. As a result, the thermosetting bonding agent is cured so that the nine plates 22-30 are fixedly attached to one another. Thus, the channel unit 4 as shown in FIG. 5 is obtained. In this event, the plates 22-30 are formed out of the same metal material. Accordingly, since the plates 22-30 have the same linear expansion coefficient, there is no fear that the channel unit 4 warps on one side.

On the other hand, to produce the actuator units 21, first in Step 2 (S2), a plurality of green sheets of piezoelectric ceramics are prepared. Each green sheet is beforehand formed in prospect of contraction due to baking. Screen printing with conductive paste is performed on one of the green sheets so as to form a pattern of the common electrode 34 thereon. While the green sheets are aligned with one another by use of a jig, the green sheet where the conductive paste has been printed with the pattern of the common electrode 34 is laid under a green sheet where the conductive paste has not been printed. Further, two green sheets where the conductive paste has not been printed are laid under the green sheet where the conductive paste has been printed.

In Step (S3), the laminate obtained in Step 2 is degreased in the same manner as known ceramics, and then backed at a predetermined temperature. Thus, the four green sheets are formed as the piezoelectric sheets 41-44, and the conductive paste is formed as the common electrode 34. After that, conductive paste is screen-printed on the piezoelectric sheet 41 which is the uppermost layer. Thus, a pattern of the individual electrodes 35 is formed. Heat treatment is applied to the laminate so as to bake the conductive paste. Thus, the individual electrodes 35 are formed on the piezoelectric sheet 41. After that, gold containing glass frit is printed on the secondary electrode regions 35*b* of the individual electrodes 35. Thus, the land portions 36 are formed. In such a manner, the actuator units 21 as shown in FIG. 6A can be produced.

The process for producing the channel unit in Step 1 and the process for producing the actuator units in Steps 2-3 are carried out independently. Accordingly, either process may be carried out before the other, or both the processes may be carried out in parallel.

Next, in Step 4 (S4), by use of a bar coater, the upper surface of the channel unit 4 obtained by Step 1, where a large number of openings of the pressure chambers 10 have been formed, is coated with an epoxy-based thermosetting bonding agent whose thermosetting temperature is about 80° C. For example, a two-part fluid mixture type is used as the thermosetting bonding agent.

Subsequently, in Step 5, the actuator units 21 are placed on the thermosetting bonding agent layer applied to the channel unit 4. In this event, each actuator unit 21 is supported by the beam portions 22*a* and positioned relatively to the channel unit 4 so as to oppose the individual electrodes 35 to the pressure chambers 10. The positioning is performed based on positioning marks (not shown) formed in the channel unit 4 and the actuator units 21 in the production processes (Steps 1 to 3) in advance.

Next, in Step 6 (S6), the laminate of the channel unit 4, the thermosetting bonding agent between the channel unit 4 and the actuator units 21, and the actuator units 21 is pressurized and heated to at least the setting temperature of the thermosetting bonding agent by a not-shown heating/pressurizing device. As a result, the openings of the pressure chambers 10 are closed by the actuator units 21. In Step 7 (S7), the laminate extracted from the heating/pressurizing device is cooled spontaneously. Thus, the head body 70 constituted by the channel unit 4 and the actuator units 21 is manufactured. The bonding process for bonding the channel unit 4 with the actuator units 21 is completed by the above-mentioned Steps 4 to 7.

Next, in Step 8 (S8) as shown in FIG. 8, a resin sheet 53 such as Naflon (registered trademark) is put as a buffer material on a support table 52 of apparatus 51 shown in FIG. 9.

This is because the surface of the head body 70 facing the support table 52 is prevented from being damaged due to its abutment against the upper surface of the support table 52 when the head body 70 is mounted on the support table 52.

The apparatus 51 shown in FIG. 9 is an apparatus for bonding the FPC 50 to each actuator unit 21. The apparatus 51 includes the support table 52, a charging unit 56, a heater 58 and a cylinder 61. The support table 52 can be mounted with the head body 70 and the resin sheet 53. The charging unit 56 has an air chamber 55 interiorly for varying the volume of the air chamber 55 to thereby charge the air into the individual ink channels 7 of the channel unit 4. The heater 58 holds the FPC 50 disposed between the charging unit 56 and the support table 52, so that the heater 58 can heat the FPC 50. The cylinder 61 can vertically move the FPC 50 held by the heater 58.

The charging unit 56 has a cylindrical guide 62, an upper cover 63*a* and a lower cover 63*b*. The guide 62 is supported on an L-shaped support portion 54 connected to the upper surface of the support table 52. The upper cover 63*a* can slide vertically while closing the upper-portion-side opening of the guide 62. The lower cover 63*b* can slide vertically while closing the lower-portion-side opening of the guide 62. In addition, the upper and lower covers 63*a* and 63*b* are separated vertically to form the air chamber 55 inside the guide 62. Further, in the vertically intermediate portion of the guide 62, as shown in FIG. 9, air vents 57 are provided at ten places along the circumference of the guide 62. A tube 66 is connected to each air vent 57 so that the tube 66 communicates with the air chamber 55. A movable portion 61*a* of the cylinder 61 is connected to the upper cover 63*a* so as to move vertically. The upper cover 63*a* moves in accordance with the vertical movement of the movable portion 61*a*. The lower surface of the lower cover 63*b* is connected to a projecting portion 58*a* projecting upward from the upper surface of the heater 58. The heater 58 moves in accordance with the vertical movement of the lower cover 63*b*. In this embodiment, the charging unit 56 may retain fluid (such as ink) in the air chamber (or fluid chamber when it is filled with fluid) 55 instead of the air, and charge the ink into the individual ink channels 7. The fluid to be used is not limited especially if it does not erode the individual ink channels 7 of the channel unit 4. Alternatively, gas other than the air may be charged into the air chamber 55.

Next, in Step 9 (S9), the head body 70 is mounted on the resin sheet 53 with the ink ejection surface 70*a* downward. The ejection surface 70*a* is the lower surface of the head body 70. In addition, the tubes 66 are connected to the ten openings 3*a* formed in the upper surface of the head body 70, respectively, so as to allow all the individual ink channels 7 of the channel unit 4 to communicate with the air chamber 55. In this event, the ink ejection surface 70*a* of the head body 70 is in close contact with the resin sheet 53. Accordingly, the ink ejection surface 70*a* are entirely covered with the resin sheet 53 so that the nozzles 8 are sealed. When all the sub-manifold channels 5*a* formed in the channel unit 4 communicate with one another, only one tube 66 may be connected to one of the ten openings 3*a* while the other nine openings 3*a* are sealed with a stopper. Thus, the number of tubes 66 can be reduced to one so that the apparatus 51 can be simplified. The above-mentioned Step 9 is a process for sealing the ink ejection surface 70*a*.

Next, in Step 10 (S10), as shown in FIG. 10A, solder 47 about 7-8 μm thick is disposed to cover the whole surface of each terminal 46 of the FPC 50. After that, in Step 11 (S11), as shown in FIG. 1A, the terminals 46 of the FPC 50 are positioned to face the land portions 36 of the individual electrodes 35 of the head body 70, while the FPC 50 is retained on the lower surface of the heater 58 by a not-shown retention unit. In this event, the FPC 50 is disposed in a position where the FPC 50 faces the upper surface of each actuator unit 21.

Next, in Step 12 (S12), the cylinder 61 is driven to move the movable portion 61*a* downward and hence to move the upper cover 63*a* of the charging unit 56 downward. As a result, the air in the air chamber 55 flows into all the individual ink channels 7 of the channel unit 4 through the tubes 66. Thus, the air is charged into the individual ink channels 7 gradually so as to increase the internal pressures of the individual ink channels 7. At the same time, the heater 58 moves downward gradually due to the pressure transmitted to the lower cover 63*b* through the air in the air chamber 55. The above-mentioned Step 12 is a process for filling the pressure chambers 10 with gas. The Steps 9-12 correspond to a process for increasing the internal pressure of each pressure chamber 10.

Next, in Step 13 (S13), when the internal pressure of each individual ink channel 7 filled with the air in Step 12 becomes almost the same as the internal pressure of the air chamber 55, the heater 58 having moved downward presses the terminals 46 of the FPC 50 and the land portions 36 of the individual electrode 35 so as to bring them into contact with each other. In this state, the heater 58 begins to heat. In Step 13, since the air chamber 55 communicates with the individual ink channels 7 of the channel unit 4 through the tubes 66, the pressing pressure transmitted to the air chamber 55 by the upper cover 63*a* is also transmitted to the individual ink channels 7 likewise, so that the internal pressure of each pressure chamber 10 increases. That is, when the terminals 46 of the FPC 50 are pressed in contact with the land portions 36 of the individual electrodes 35 as shown in FIG. 10B, pressure P as high as the pressing pressure occurs in each pressure chamber 10 opposed to each individual electrode 35 due to the air flowing into the pressure chamber 10 so that the internal pressure of the pressure chamber 10 increases. Thus, the internal pressure of each pressure chamber 10 can be substantially equalized with the pressing pressure between its corresponding terminal 46 and its corresponding land portion 36 easily. In addition, since the terminals 46 of the FPC 50 and the land portions 36 of the individual electrodes 35 are pressed against each other, the ink ejection surface 70*a* of the head body 70 is pressed against the resin sheet 53. Thus, the nozzles 8 are sealed more perfectly.

Next, in Step 14 (S14), the head body 70 where the FPC 50 has been bonded to each actuator unit 21 is detached from the support table 52 of the apparatus 51, and cooled spontaneously. Then, the solder 47 heated by the heater 58 in Step 13 is solidified in close contact with each terminal 46 and each land portion 36 as shown in FIG. 10B. Thus, each terminal 46 of the FPC 50 is perfectly bonded to the land portion 36 of each individual electrode 35. After that, the aforementioned inkjet head 1 is completed through a process for bonding the base block 71, and so on.

According to the aforementioned method for manufacturing the inkjet head 1, when the terminals 46 of the FPC 50 are pressed against the land portions 36 of the individual electrodes 35 disposed in positions where the individual electrodes 35 are opposed to the pressure chambers 10 of the channel unit 4, the internal pressure of each pressure chamber 10 increases due to the air charged from the air chamber 55. Accordingly, the piezoelectric sheets 41-44 opposed to the individual electrodes 35 become difficult to bend on the pressure chambers 10 side in spite of pressing force applied thereto. Thus, the pulling force generated by the bending of the piezoelectric sheets 41-44 is reduced so that the piezoelectric sheets 41-44 can be prevented from being damaged.

In addition, since the pressing pressure with which the terminals 4-6 of the FPC 50 are pressed against the land portions 36 is almost the same as the internal pressure of the pressure chambers 10, the piezoelectric sheets 41-44 of the actuator units 21 hardly bend on the pressure chamber side. Accordingly, the actuator units 21 can be surely prevented from being damaged.

Moreover, since the ink ejection surface 70*a* of the head body 70 is covered and sealed with the resin sheet 53, the air charged from the air chamber 55 into the individual ink channels 7 is prevented from escaping from the nozzles 8 in the ink ejection surface 70*a*. Thus, the internal pressure of the pressure chambers 10 can be increased easily. In addition, when the air is charged into the individual ink channels 7, the air is not perfectly absent from the air chamber 55. Accordingly, pressure as high as the internal pressure generated in the air chamber 55 due to the pressing pressure of the cylinder 61 can be generated in each pressure chamber 10.

In the inkjet head 1 according to the aforementioned embodiment, the terminals 46 of the FPC 50 are pressed and bonded onto the land portions 36 of the individual electrodes 35 of the actuator units 21 of the head body 70 respectively by use of the apparatus 51. However, the land portions 36 and the terminals 46 may be bonded to each other by use of pressing apparatus having no charging unit 56. That is, the charging unit 56 may be replaced by a not-shown pump, by which fluid is forcibly charged so that pressure as high as the pressing pressure between the terminals 46 and the land portions 36 is generated in the individual ink channels 7 of the channel unit 4. In this state, the terminals 46 of the FPC 50 are pressed and bonded onto the land portions 36. Thus, in the same manner as described above, the piezoelectric sheets 41-44 of the actuator units 21 can be prevented from being damaged.

Further, the aforementioned charging unit 56 may be a bag connected to the tubes 66 and filled with fluid. In this manner, when the terminals 46 of the FPC 50 are pressed against the land portions 36, the fluid from the bag flows into the channel unit 4 so that the internal pressure of the pressure chambers 10 increases. Thus, effect similar to the aforementioned one can be obtained. In addition, solder 47 may be disposed on the land portions 36 of the actuator units 21 of the head body 70 in Step 10, and the FPC 50 whose terminals 46 have been aligned with the lands portion 36 may be mounted on the actuator units 21 in Step 11. In this manner, it is not necessary to provide a device which holds the FPC 50 on the lower surface of the heater 58.

According to the embodiment, a planar shape of each of the pressure chambers is a parallelogram having two acute angle portions, and each of the secondary electrode regions is disposed in a position opposed to one of the acute angle portions of corresponding one of the pressure chambers. With this configuration, reduction in displacement of the piezoelectric sheet can be suppressed effectively while the pressure chambers are arrayed in high density.

According to the embodiment, the flexible cable is pressed against the actuator unit with pressure substantially as high as the internal pressure in each of the pressure chambers in the step of connecting the flexible cable to the actuator unit. Accordingly, the actuator unit hardly bends on the pressure chamber side when the flexible cable is pressed against the actuator unit. It is therefore possible to effectively prevent the actuator unit from being damaged.

According to the embodiment, when internal pressure is increased in each of the pressure chambers an ink ejection surface where the nozzles are formed is sealed. Accordingly, the internal pressure in each pressure chamber becomes easy to increase.

In this case, when internal pressure is increased in each of the pressure chambers, gas is introduced from the ink inlets after sealing, and the pressure chambers are filled with the gas. Accordingly, since the pressure chambers are filled with the gas, the pressing pressure of the flexible cable against the actuator unit can be easily made substantially as high as the internal pressure in each pressure chamber.

Description has been made above about the preferred embodiments of the invention. However, the invention is not limited to the aforementioned embodiments. Various changes on design can be made on the invention within the scope stated in Claims. For example, although each individual electrode 35 of the aforementioned inkjet head 1 is disposed in a position where the secondary electrode region 35*b* of the individual electrode 35 is opposed to one acute angle portion of its corresponding pressure chamber 10, the secondary electrode region 35*b* may be disposed in any position if it is opposed to the pressure chamber 10. Preferably, the secondary electrode region 35*b* is disposed in a position where it is opposed to an end portion of the pressure chamber.

Further, in the aforementioned embodiments, each individual electrode 35 is formed to be wholly opposed to its corresponding pressure chamber 10, while the secondary electrode region 35*b* of the individual electrode 35 connected to a corresponding terminal of the FPC 50 is disposed in a position where the secondary electrode region 35*b* is opposed to one acute angle portion of the pressure chamber 10. However, another secondary electrode region 35*b* may be also provided in the other acute angle portion. That is, each individual electrode 35 may be opposed to its corresponding pressure chamber 10 having a rhomboid shape, while the primary electrode region 35*a* of the individual electrode 35 is extended to regions where the primary electrode region 35*a* overlaps the opposite acute angle portions so that the individual electrode 35 as a whole is formed to be substantially similar to the pressure chamber 10. The acute angle portion is a portion formed so that side wall portions structurally constituting the pressure chamber 10 are opposed to the acute angle portion closely thereto. The piezoelectric sheets 41-44 present in the regions hardly contribute to a change in volume of the pressure chamber 10 in spite of a driving voltage applied thereto. Therefore, as in this modification, the secondary electrode regions 35*b* having land portions 36 to be connected to the FPC 50 respectively are provided in the two acute angle portions of the pressure chamber 10. As a result, the deformation of the portion opposed to the primary electrode region 35*a* is hardly blocked. Thus, the reliability in electric connection is improved so that it is possible to make it difficult to produce a failure.

What is claimed is:

1. A method for manufacturing an inkjet head, comprising:

producing a channel unit including a plurality of pressure chambers communicating with nozzles respectively and arrayed in a plane, and ink channels extending from ink inlets to the nozzles through the pressure chambers respectively, the pressure chambers having openings in one surface of the channel unit parallel to the plane;

producing an actuator unit including individual electrodes having planar shapes not larger than planar regions of the pressure chambers respectively, a common electrode formed over the individual electrodes, and a piezoelectric sheet put between the common electrode and a plurality of the individual electrodes;

bonding the actuator unit to the one surface of the channel unit while aligning the individual electrodes such that the individual electrodes are included in the planar regions of the pressure chambers respectively in plan view;

increasing internal pressure in each of the pressure chambers; and pressing a flexible cable against the actuator unit with increased internal pressure in each of the pressure chambers so as to connect terminals of the flexible cable to the individual electrodes of the actuator unit respectively, the flexible cable serving to supply driving signals to the actuator unit.

2. A method for manufacturing an inkjet head according to claim 1, wherein the flexible cable is pressed against the actuator unit with pressure substantially as high as the internal pressure in each of the pressure chambers, when the flexible cable is connected to the actuator unit.

3. A method for manufacturing an inkjet head according to claim 1, wherein an ink ejection surface where the nozzles are formed is sealed, when internal pressure is increased in each of the pressure chambers.

4. A method for manufacturing an inkjet head according to claim 1, wherein when internal pressure is increased in each of the pressure chambers, fluid is introduced from the ink inlets after the ink ejection surface is sealed, so that the pressure chambers are filled with the fluid.

5. A method for manufacturing an inkjet head according to claim 4, wherein the fluid is gas.

6. A method for manufacturing an inkjet head comprising:

preparing a main body including a plurality of pressure chambers arrayed in a plane, ink channels extended through the pressure chambers respectively, individual electrodes and a common electrode;

increasing internal pressure of at least a part of the plurality of pressure chambers;

connecting terminals of a flexible cable to the individual electrodes of the main body, the connecting step includes pressing the flexible cable against the main body under the condition that the internal pressure of the at least a part of the plurality of pressure chambers is increased by the increasing step.

7. A method for manufacturing an inkjet head according to claim 6, wherein the flexible cable is pressed against the main body with pressure substantially as high as the internal pressure in each of the pressure chambers, when the flexible cable is connected to the main body.

8. A method for manufacturing an inkjet head according to claim 6, wherein the pressure chambers communicate with nozzles respectively, and an ink ejection surface where the nozzles are formed is sealed, when internal pressure is increased in each of the pressure chambers.

9. A method for manufacturing an inkjet head according to claim 8, wherein the ink channels extend from ink inlets to the nozzles through the pressure chambers respectively, and when internal pressure is increased in each of the pressure chambers, fluid is introduced from the ink inlets after the ink ejection surface is sealed, so that the pressure chambers is filled with the fluid.

10. A method for manufacturing an inkjet head according to claim 9, wherein the fluid is gas.

11. A method for manufacturing an inkjet head according to claim 6, wherein the individual electrodes are positioned within the corresponding pressure chambers respectively as viewed in a direction perpendicular to the plane.

12. A method for manufacturing an inkjet head according to claim 6, wherein the individual electrodes have lands at which the terminals of the flexible cable are electrically connected to the individual electrodes, respectively; and the lands are entirely overlapped with corresponding pressure chambers respectively as viewed in a direction perpendicular to the plane.

13. A method for manufacturing an inkjet head according to claim 9, wherein the fluid is liquid.

* * * * *